(12) United States Patent
Behnen et al.

(10) Patent No.: US 11,487,824 B2
(45) Date of Patent: Nov. 1, 2022

(54) AUTOMATED DATABASE QUERY FILTERING FOR SPATIAL JOINS

(71) Applicant: INTERNATIONAL BUSINESS MACHINES CORPORATION, Armonk, NY (US)

(72) Inventors: Marion Behnen, Austin, TX (US); Pooja Bhandari, San Jose, CA (US); Christian Zentgraf, Columbus, OH (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 16/789,889

(22) Filed: Feb. 13, 2020

(65) Prior Publication Data
US 2021/0256065 A1    Aug. 19, 2021

(51) Int. Cl.
*G06F 16/00* (2019.01)
*G06F 16/9035* (2019.01)
(Continued)

(52) U.S. Cl.
CPC ........ *G06F 16/9035* (2019.01); *G06F 16/221* (2019.01); *G06F 16/2228* (2019.01); *G06F 16/29* (2019.01)

(58) Field of Classification Search
CPC .............. G06F 16/9035; G06F 16/221; G06F 16/2228; G06F 16/29
See application file for complete search history.

(56) References Cited

U.S. PATENT DOCUMENTS

| 5,781,906 A |   | 7/1998 | Aggarwal |
| 6,014,614 A | * | 1/2000 | Herring ................... G06F 16/29 |
|   |   |   | 382/176 |

(Continued)

FOREIGN PATENT DOCUMENTS

| CN | 106407213 A | 2/2017 |
| CN | 106844534 A | 6/2017 |
| CN | 107423368 A | 12/2017 |

OTHER PUBLICATIONS

Yi Fang, Spatial Indexing in Microsoft SQL Server 2008, Jun. 9-12, 2008, SIGMOD, pp. 1207-1215 (Year: 2008).*

(Continued)

*Primary Examiner* — Thu Nguyet T Le
(74) *Attorney, Agent, or Firm* — Schmeiser, Olsen & Watts, LLP; Stephanie Carusillo

(57) ABSTRACT

A method, system, and program product for implementing an automated query filtering process for spatial data is provided. The method includes selecting a set of common depth levels for geohash structures. Data indicating results of the selection is stored and a specified depth level of the set of common geohash depth levels is selected. The selected geohash depth level is associated with a spatial column for spatial data to determine a set of geohash depth levels required to generate geohash values. A filter table or index associated with the spatial column is generated based on the selected subset of common geohash depth levels and a relationship between the spatial column, the specified geohash depth level and the filter table is stored within a database. Geohash values for the filter table are generated and a query of the database is executed with respect to the specified geohash depth level, the filter entries, and the filter table.

18 Claims, 16 Drawing Sheets

(51) Int. Cl.
*G06F 16/29* (2019.01)
*G06F 16/22* (2019.01)

(56) References Cited

U.S. PATENT DOCUMENTS

| | | |
|---|---|---|
| 6,438,269 B1 | 8/2002 | Kim |
| 6,700,574 B1 | 3/2004 | Song |
| 7,437,372 B2 | 10/2008 | Chen |
| 7,539,666 B2 | 5/2009 | Ashworth |
| 7,769,733 B2 | 8/2010 | Chen |
| 2005/0023524 A1 | 2/2005 | Beatty |
| 2010/0114905 A1 | 5/2010 | Slavik |
| 2017/0303106 A1 | 10/2017 | Kannan |
| 2019/0228024 A1 | 7/2019 | Brodt |
| 2020/0034365 A1 | 1/2020 | Martin |

OTHER PUBLICATIONS

Willhaben, Geo Clustering 3,000,000 Points On The Fly: A Brief How to, Jul. 21, 2015, Willhaben Tech Blog (Year: 2015).*
Mell, Peter et al.; "The NIST Definition of Cloud Computing;" National Institute of Standards and Technology; Special Publication 800-145; Sep. 2011; 7 pages.
2d Index Internals—MongoDB Manual; https://docs.mongodb.com/manual/core/geospatial-indexes; retrieved from the Internet May 6, 2021; 3 pages.
Niemeyer, Gustavo; Labix Blog; : https://web.archive.org/web/20080305223755/http://blog.labix.org/#post-85; Mar. 3, 2008; 9 pages.

* cited by examiner

Base table and Filter tables
Data Table: RIDES

| RIDE_ID | START_LOCATION | RIDE_PATH |
|---|---|---|
| 1001 | POINT (1.000000000 1.000000000) | LINESTRING (1.000000000 1.000000000, 1.000000000 1.500000000) |
| 1002 | POINT (2.500000000 3.000000000) | LINESTRING (2.200000000 3.200000000, 0.000000000 3.000000000) |
| 1003 | POINT (0.000000000 0.000000000) | POLYGON ((0.000000000 0.000000000, 1.000000000 0.000000000, 1.000000000 2.100000000, 0.000000000 1.050000000, 0.000000000 0.100000000)) |
| 1004 | POINT (0.000000000 1.000000000) | POLYGON ((0.000000000 0.000000000, 1.000000000 0.000000000, 1.000000000 2.200000000, 0.000000000 1.000000000, 0.000000000 0.000000000)) |

Filter Table: START_LOC_FILTER_TABLE

| RIDE_ID | GH_P | GH_S | GH_M | GH_L | GH_H |
|---|---|---|---|---|---|
| 1001 | 4611230305190674432 | -4611230330957151488 | -4611230820613488640 | -4611263805962321920 | -4611686018427387904 |
| 1002 | -4606425705378480128 | -4606425748641677312 | -4606425684800107520 | -4606478731358240768 | -4607182418800017408 |
| 1003 | 4611686018427387904 | 4611686018427387904 | 4611686018427387904 | 4611686018427387904 | 4611686018427387904 |
| 1004 | 4611382209602912256 | 4611382209602738048 | -4611382532816121728 | -4611404543450677248 | 4611686018427387904 |

GH_P: geohash at depth 45
GH_S: geohash at depth 28
GH_M: geohash at depth 23
GH_L: geohash at depth 18
GH_H: geohash at depth 13

Filter Table2: RIDE_PATH_FILTER_TABLE  704

| RIDE_ID | GH_L | GH_H |
|---|---|---|
| 1001 | -4611263805962321920 | -4611686018427387904 |
| 1002 | -4607182418800017408 | -4607182418800017408 |
| 1003 | -4611686018427387904 | -4611686018427387904 |
| 1004 | -4611686018427387904 | -4611686018427387904 |
| 1002 | -4607041681311662080 | - |
| 1002 | -4606478731358240768 | - |
| 1002 | -4606408362614063104 | - |
| 1004 | -4611615649683210240 | - |
| 1004 | -4611404543450677248 | - |
| 1004 | -4610560118520545280 | - |
| 1003 | -4611615649683210240 | - |
| 1003 | -4611404543450677248 | - |
| 1003 | -4610560118520545280 | - |
| 1003 | -4611545280939032576 | - |
| 1003 | -4611474912194854912 | - |
| 1003 | -4611193437218144256 | - |

Filter Table2: RIDE_PATH_FILTER_TABLE

| RIDE_ID | GH_L | GH_H |
|---|---|---|
| 1002 | -4606619468846596096 | - |
| 1002 | -4607112050055839744 | - |
| 1004 | -4611545280939032576 | - |
| 1004 | -4611474912194854912 | - |
| 1004 | -4611193437218144256 | - |
| 1004 | -4610137906055479296 | - |
| 1002 | -4606549100102418432 | - |
| 1004 | -4611263805962321920 | - |
| 1004 | -4610419381032189952 | - |
| 1004 | -4610349012288012288 | - |
| 1003 | -4611263805962321920 | - |
| 1003 | -4610419381032189952 | - |
| 1003 | -4610349012288012288 | - |
| 1001 | -4611193437218144256 | - |
| 1001 | -4610419381032189952 | - |
| 1003 | -4611334174706499584 | - |
| 1003 | -4610489749776367616 | - |
| 1002 | -4606971612567484416 | - |
| 1004 | -4611334174706499584 | - |
| 1004 | -4610489749776367616 | - |
| 1004 | -4610278643543834624 | - |

FIG. 7C

AUTOMATED DATABASE QUERY FILTERING FOR SPATIAL JOINS

BACKGROUND

The present invention relates generally to a method for automatically filtering a spatial database query and in particular to a method and associated system for improving database technology associated with selecting depth levels for geohash values, generating a filtering table and associated filter entries, and executing a database query with respect to the selected depth levels, the filter entries, and the filter table.

SUMMARY

A first aspect of the invention provides an automated query filtering method comprising: selecting, by a processor of a database controller, a set of common geohash depth levels for a plurality of spatial columns; storing, by the processor, data indicating results of the selecting the set of common depth levels; selecting, by the processor, a specified depth level of the set of common depth levels, wherein the specified depth level is associated with a spatial column for spatial data, to determine a subset of geohash depth levels, of the selected set of common depth levels, required to construct the plurality of geohash structures; automatically generating, by the processor, a filter table associated with the spatial column based on the selected subset of common geohash depth levels; storing within a database, by the processor, a relationship between the selected geohash depth level and the filter table; generating, by the processor, filter entries for the filter table according to the selected subset of common geohash depth levels; and executing, by the processor, a query of the database with respect to the specified depth level, the filter entries, and the filter table.

A second aspect of the invention provides a computer program product, comprising a computer readable hardware storage device storing a computer readable program code, the computer readable program code comprising an algorithm that when executed by a processor of database controller implements an automated query filtering method, the method comprising: selecting, by said processor, a set of common geohash depth levels for a plurality of spatial columns; storing, by the processor, data indicating results of the selecting the set of common depth levels; selecting, by the processor, a specified depth level of the set of common depth levels, wherein the specified depth level is associated with a spatial column for spatial data to determine a subset of geohash depth levels, of the selected set of common depth levels, required to construct the plurality of geohashes; automatically generating, by the processor, a filter table associated with the spatial column based on the selected subset of common geohash depth levels; storing within a database, by the processor, a relationship between the selected depth level and the filter table; generating, by the processor, filter entries for the filter table according to the selected subset of common geohash depth levels; and executing, by the processor, a query of the database with respect to the specified depth level, the filter entries, and the filter table.

A third aspect of the invention provides a database controller comprising a processor coupled to a computer-readable memory unit, the memory unit comprising instructions that when executed by the processor implements an automated query filtering method comprising: selecting, by said processor, a set of common geohash depth levels for a plurality of geohash structures spatial columns; storing, by the processor, data indicating results of the selecting the set of common depth levels; selecting, by the processor, a specified depth level of the set of common depth levels, wherein the specified depth level is associated with a spatial column for spatial data to determine a subset of geohash depth levels, of the selected set of common depth levels, required to construct the plurality of geohashes; automatically generating, by the processor, a filter table associated with the spatial column based on the selected subset of common geohash depth levels; storing within a database, by the processor, a relationship between the specified selected depth level and the filter table; generating, by the processor, filter entries for the filter table according to the selected subset of common geohash depth levels; and executing, by the processor, a query of the database with respect to the specified depth level, the filter entries, and the filter table.

The present invention advantageously provides a simple method and associated system capable of accurately filtering a query.

BRIEF DESCRIPTION OF THE DRAWINGS

FIGS. 7A, 7B, and 7C illustrate a base table and filter tables, in accordance with embodiments of the present invention.

DETAILED DESCRIPTION

Figure 1:
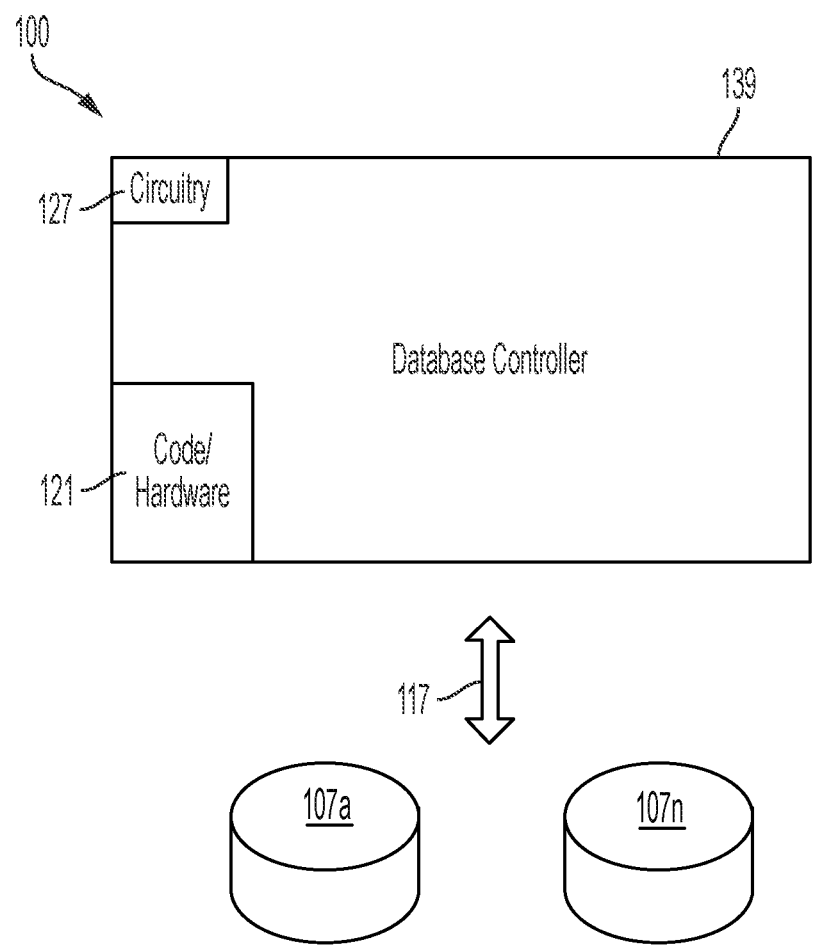
FIG. 1 illustrates a system for improving database technology associated with selecting depth levels for geohash structures, generating a filtering table and associated filter entries, and executing a database query with respect to the selected geohash depth levels, the filter entries, and the filter table, in accordance with embodiments of the present invention.

FIG. 1 illustrates a system 100 for improving database technology associated with selecting depth levels for geohash structures, generating a filtering table and associated filter entries, and executing a database query with respect to the selected geohash depth levels, the filter entries, and the filter table, in accordance with embodiments of the present invention. System 100 addresses issues associated with software applications generating and using geospatial data to provide or improve services for customers. For example, geospatial data may include, customer addresses, global positioning data (GPS) data, locations of weather related incidences, locations of land parcels, etc. Typical geospatial data may be associated with a geometry described via coordinates configured to build anchor points for vertices describing a shape of the geometry. The multi-dimensional coordinates may describe a spatial shape with a single point being defined by at least an x and a y value and potentially a z value. Likewise, complex geometrical shapes may include a large number of coordinates. Typical spatial calculations to determine relationships between geometries (e.g., to determine if a geometry intersects another geometry) may be costly as it may be necessary to calculate and compare all the vertices that constitute the boundaries for each geometry. Therefore, it may be important to apply an index or filter that allows to significantly reduce number of calculations to improve a query performance.

Likewise, regular indexes that hold a single (one-dimensional) data value in an ordered sequence (e.g., within a B-tree) may not accommodate shapes defined through multiple values (each equally important to describe a geometry). Therefore, customized indexing or filtering mechanisms must be used.

A typical approach to filter spatial data may include applying a grid mechanism defining a grid over an area such that shapes are represented by associated grid cell information. Grid sizes are typically required to be large enough to fit a largest geometry in a set or multiple cells may be required to cover the geometry. For example, during a search process associated with determining if a given shape intersects another shape, it may not be necessary to compare all shapes as only shapes that share at least one grid cell are compared thereby implying that grid cell definitions across different sets of geometries must match or may be converted without information loss. A disadvantage of the aforementioned approach for filtering spatial data my include cell sizes reflecting the small geometry (when comparing shapes with significantly different sizes) thereby causing too many cell entries for a large geometry or reflecting a large geometry resulting in a large number of superfluous small geometries being included as candidates.

Given ever-increasing amounts of geospatial data collected by devices (e.g., Internet of things (IOT) devices), an improved process for allowing large amounts data to be filtered for spatial relationships is preferable.

In a relational database management system (RDBMS), spatial data is stored within a column designed to store a representation of the spatial data. Subsequently, structured query language (SQL) queries are enabled to compute outputs based on geospatial relationships of contents of the spatial data in each row. For example, a process for implementing a query to answer a question may determine if any geometries in one table intersect with geometries in another table thereby requiring a RDBMS to perform a cartesian join to test or evaluate every combination of geometry. The resulting computation may be very costly and may not be feasible to be implemented if tables include millions of rows. Therefore, system 100 is enabled to execute a process for quickly and inexpensively determining if a geometry is required within an actual geospatial computation to reduce the amount of geospatial computations necessary to satisfy the query.

Figure 3:
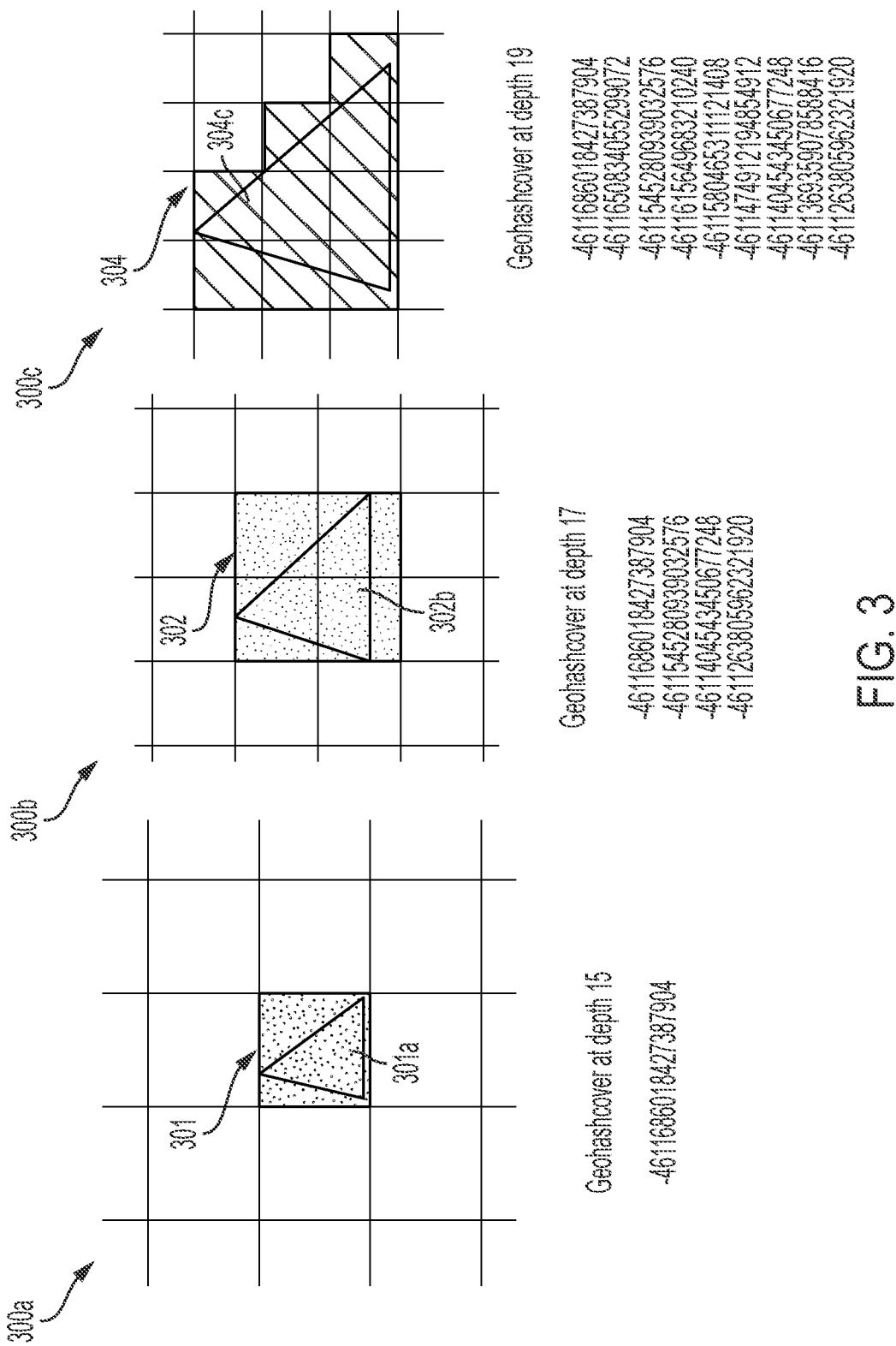
FIG. 3 illustrates geohash covers associated with geometries, in accordance with embodiments of the present invention.

System 100 enables a process for selecting depth levels for geohash structures within a geohash cover via analysis of a filter table. A geohash structure is defined herein as a structure configured to contain a geographic location represented as a short string of letters and digits based on a given geohash depth level. The geographic location may include a specified area or cell (of a grid) depending on an associated geohash depth (e.g., as illustrated in FIG. 3, infra). Therefore, a geohash value based on a geohash depth level in a coordinate system is configured to identify a cell of a grid that may be calculated based on an associated granularity such that the less granular the geohash depth level, the larger the cells of the grid. Likewise, one or more geohash values of a specific geometry in a spatial column may be calculated based on a coordinate system and coordinates of the geometry and the geohash depth level associated with the spatial column.

A geohash cover is defined herein as one or more cells (of a grid) touching or located within a geometry. At a most granular level, a geohash cover may represent a cell comprising a size of a few meters. Likewise, point geometries may be represented by one geohash value at any level of geohash depths. However, one or more geohashes can be calculated from a polygon depending on an associated depth level. For example, a polygon representing a state in the United States may return all cells touching or covering the state when calculating a geohash cover at a depth of counties.

A geohash depth level is defined herein as an attribute defining a size of a cell identified by a geohash structure. A larger depth is configured to decrease a cell size.

A filter table is defined herein as either a relation-based table or other mechanism similar to an index for storing an identifier and geohash values for a geometry identified in a user table at various depths.

System 100 enables a process for creating a filter table (for each geometry column) for storing all geohash values. A correlation of a geometry column and an associated filter table or index is stored as a dependency or association. The filter table may include the following attributes: a unique identifier (e.g., a primary key column(s) or a row identifier) and a number of integer columns to hold a geohash value for each depth defined for the filter. The geohash depths may be predefined and are inverse to cell size such that the larger the depth, the smaller the cell size.

System 100 of FIG. 1 includes a database controller 139 (i.e., specialized hardware device) and a database system including database 107a . . . 107n (e.g., a cloud-based system) interconnected through a network 117. Database controller 139 includes specialized circuitry 127 (that may include specialized software) and code hardware 121 (i.e., including machine-learning software code). Database controller 139 may include, inter alia, a computing device, a dedicated hardware device, etc. Database controller 139 may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, database controller 139 may comprise a specialized hardware device comprising specialized (non-generic) hardware and circuitry (i.e., specialized discrete non-generic analog, digital, and logic-based circuitry) for (independently or in combination) executing a process described with respect to FIGS. 1-12. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving database technology associated with selecting depth levels for geohash structures, generating a filtering table and associated filter entries, and executing a database query with respect to the selected depth levels, the filter entries, and the filter table. Network 117 may include any type of network including, inter alia, a 5G telecom network, a local area network, (LAN), a wide area network (WAN), the Internet, a wireless network, etc. Alternatively, network 117 may include an application programming interface (API).

System 100 enables the following process for filtering candidate rows for spatial processing during query execution. The process is initiated when a set of common geohash depth levels is defined and applied to generate geohashes. The set of geohash levels is configured to be used for various geometry sizes. Subsequently, a preferred geohash depth level is selected from the set of common depth levels for the set of geometries in a spatial column and geohashes are calculated for the following geohash depth levels:
1. A selected preferred geohash depth level m.
2. Geohash depth levels larger than the preferred geohash depth level defined in the set of geohash depth levels.
3. A geohash depth level m−1 for the preferred geohash depth level m, if depth level m−1 exists.

Figure 2:
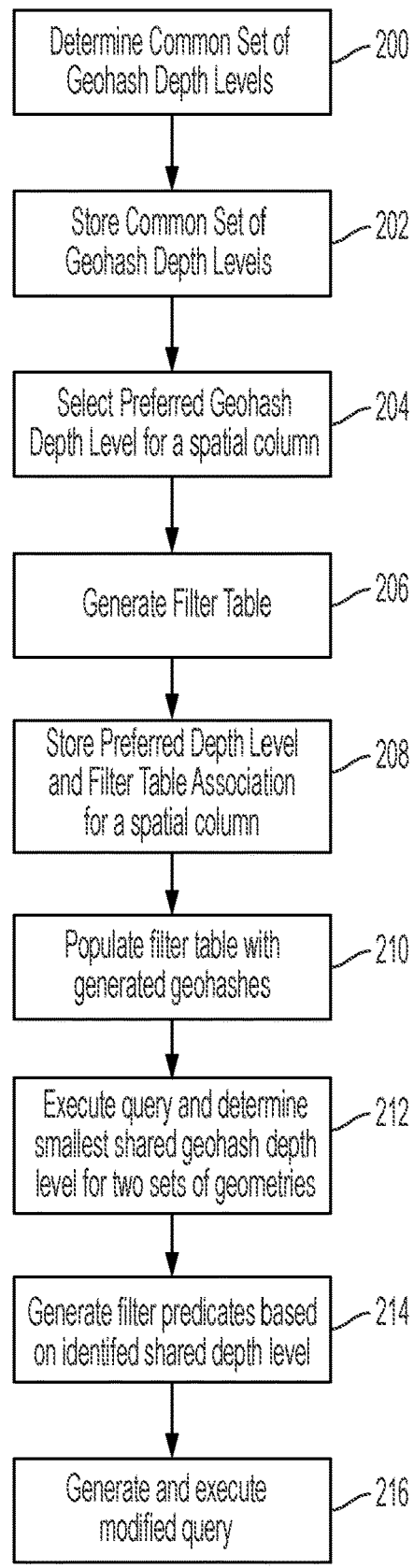
FIG. 2 illustrates an algorithm detailing a process flow enabled by the system of FIG. 1 for improving database technology associated with selecting depth levels for geohash structures, generating a filtering table and associated filter entries, and executing a database query with respect to the selected depth levels, the filter entries, and the filter table, in accordance with embodiments of the present invention.

Generated geohashes for each geometry are stored. The generated geohashes are generated from a set of spatial data in an associated data set allowing: a 1:n relationship between a geometry and associated geohash structures and a unique identification of the geohash values belonging to a specific geometry. Subsequently, a geohash level for query processing is determined by identifying a smallest common geohash depth level of two sets of geometries. Likewise, queries are modified for detecting geohash equality between stored geohash values of two sets of geometries using a geohash level for processing the two sets of geometries FIG. 2 illustrates an algorithm detailing a process flow enabled by system 100 of FIG. 1 for improving database technology associated with selecting depth levels for geohash structures, generating a filtering table and associated filter entries, and executing a database query with respect to the selected depth levels, the filter entries, and the filter table, in accordance with embodiments of the present invention. Each of the steps in the algorithm of FIG. 2 may be enabled and executed by a computer processor(s) executing computer code. Additionally, each of the steps in the algorithm of FIG. 2 may be enabled and executed by database controller 139. In step 200, a set of common geohash depth levels for a plurality of spatial columns are selected. In step 202, data indicating results of selecting the set of common depth levels is stored. In step 204, a specified geohash depth level is selected from the set of common depth levels. The specified depth level is associated with a spatial column for spatial data to determine a set of geohash depth levels selected from the set of common depth levels required to construct the plurality of geohash structures. Selecting the specified depth level may include:
1. Analyzing a user selection from the plurality of common depth levels.
2. Analyzing sample data within the spatial column for determining the specified depth level.
3. Applying a default value to the set of common depth levels.

In step 206, a filter table associated with the spatial column is automatically generated based on the selected set of common depth levels. In step 208, a relationship between the spatial column, the specified depth level and the filter table is stored in a database. In step 210, filter entries are generated and stored in the filter table. Generating the filter entries for the filter table may include generating the plurality of geohashes with respect to associated geometries based on an assigned geohash depth level (m). Generating the plurality of geohashes may include:
1. Computing the plurality of geohashes for all defined levels if the assigned depth level (m) for an associated geometry set equals a lowest defined geohash depth level.
2. Computing the plurality of geohashes for a highest depth level and a depth level located immediately below if the assigned depth level (m) for an associated geometry set equals a highest defined geohash depth level.
3. Computing the plurality of geohashes for the assigned depth level (m), a depth level located immediately below the assigned depth level, and all depth levels located above the assigned depth level up to a highest depth level if the assigned depth level (m) for the associated geometries is located between the highest and the lowest defined geohash depth level in the set of common geohash depth levels.

In step 212, a query of the database is executed with respect to the specified geohash depth level, the filter entries, and the filter table. Executing the query includes:
1. Inputting, at least two sets of geometries (equal to the spatial columns) into at least one spatial relation function associated with the query.
2. Selecting the assigned geohash depth level for each set of geometries (of the at least two sets of geometries) associated with the query.
3. Selecting a smallest shared populated depth level of a plurality of spatial columns for each spatial column associated with the at least one spatial relation function.
4. Selecting, groups of geometries of the at least two sets of geometries such that values of a geohash of an associated geometry of a first set of geometries matches a value of a geohash of an associated geometry of a second set of geometries.
5. Executing specialized software with respect to matched geometries within the groups of geometries such that predicates of the query are generated.

In step 214, filter predicates are generated based on the identified shared depth level to compare the values of the geohashes associated with the first set of spatial data for equality with the geohashes associated with the second set of spatial data using the geohash values based on the smallest shared geohash depth level. In step 216, a modified query is generated and executed. The generated filter predicates are associated with the original query to determine equality between the plurality of geohashes before processing the spatial function. The modified query is executed with respect to the specified depth level, the filter entries, and the filter table.

FIG. 3 illustrates grids 300*a*, 300*b*, and 300*c* comprising geohash covers 301, 302, and 304 associated with geometries 301a, 302b, and 304c, in accordance with embodiments of the present invention. Geohash covers 301, 302, and 304 are generated based on the selected geohash depth level for a spatial column and mapped to the original data by using the unique identifier (as illustrated in related filter tables of FIG. 6, infra). Likewise, when inserting or updating spatial data in a spatial column, the geohash values at various depths are generated for each geometry and stored in the filter table. If the geometry is not represented with a single geohash at a given depth, multiple geohash values are created and inserted into the filter table. In this example, the geohash cover for the geometry in 302 and 304 requires multiple values.

Figure 4A:
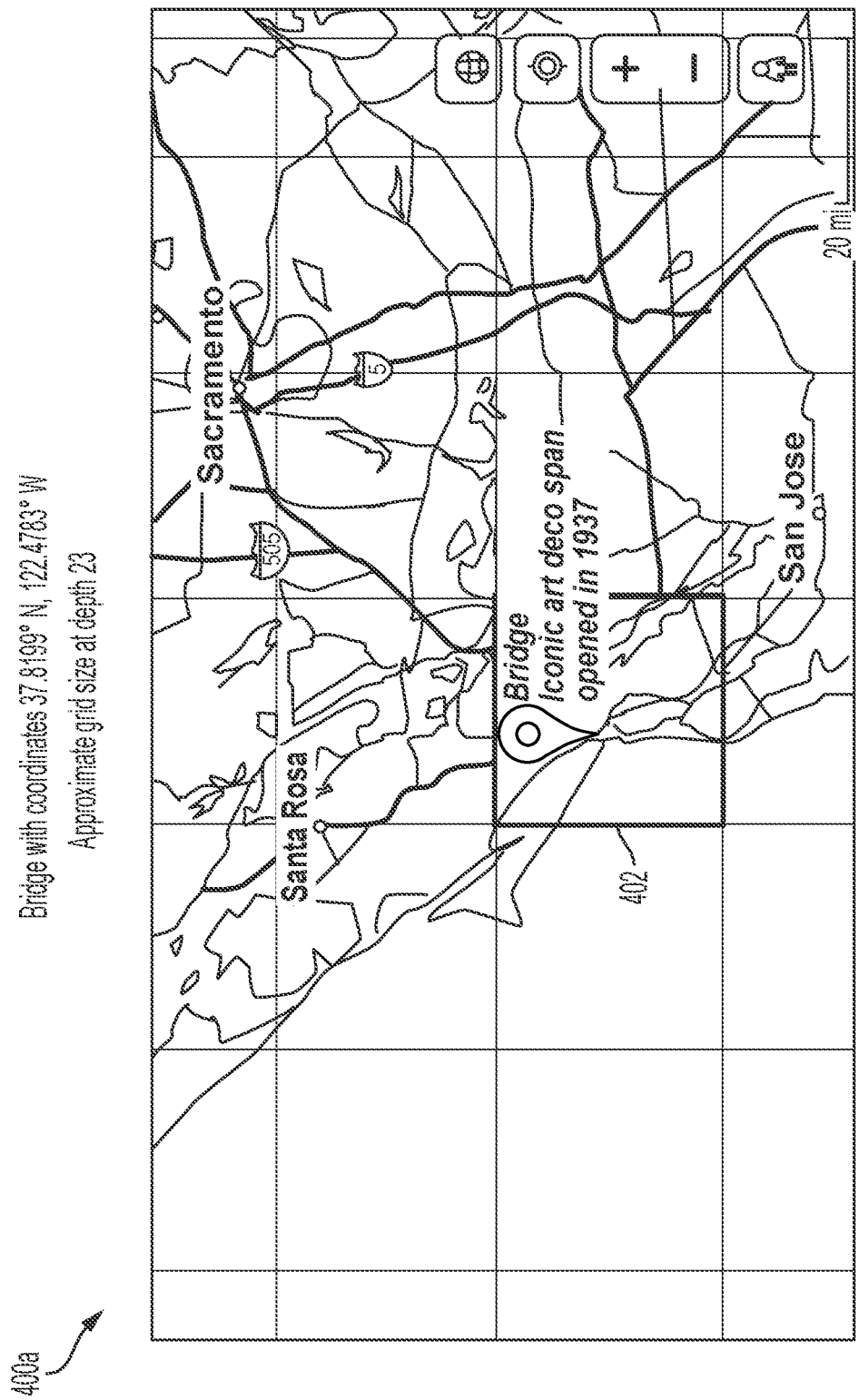
FIGS. 4A-4C illustrate maps generated by the system of FIG. 1, in accordance with embodiments of the present invention.
Figure 4B:
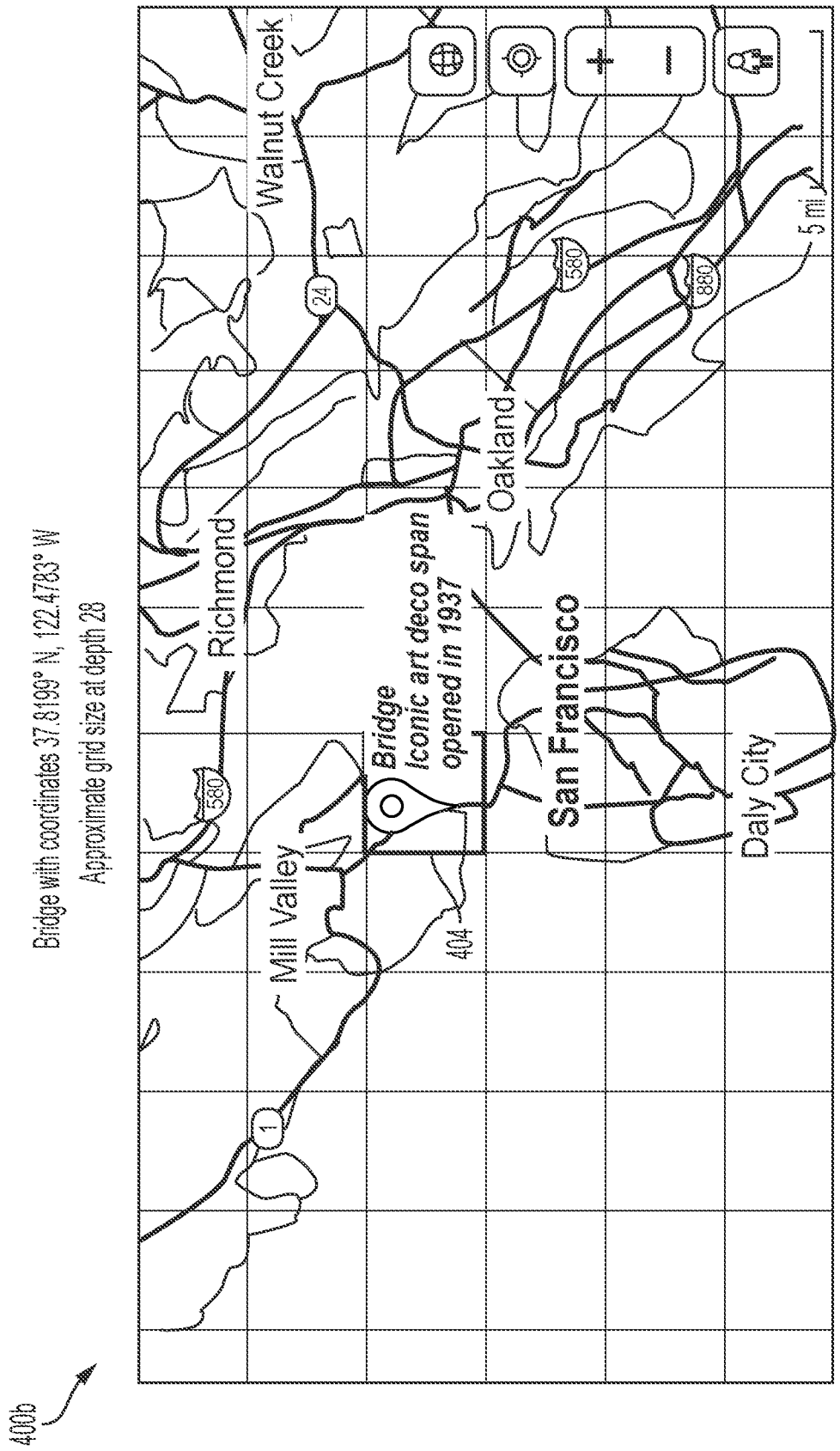
Figure 4C:
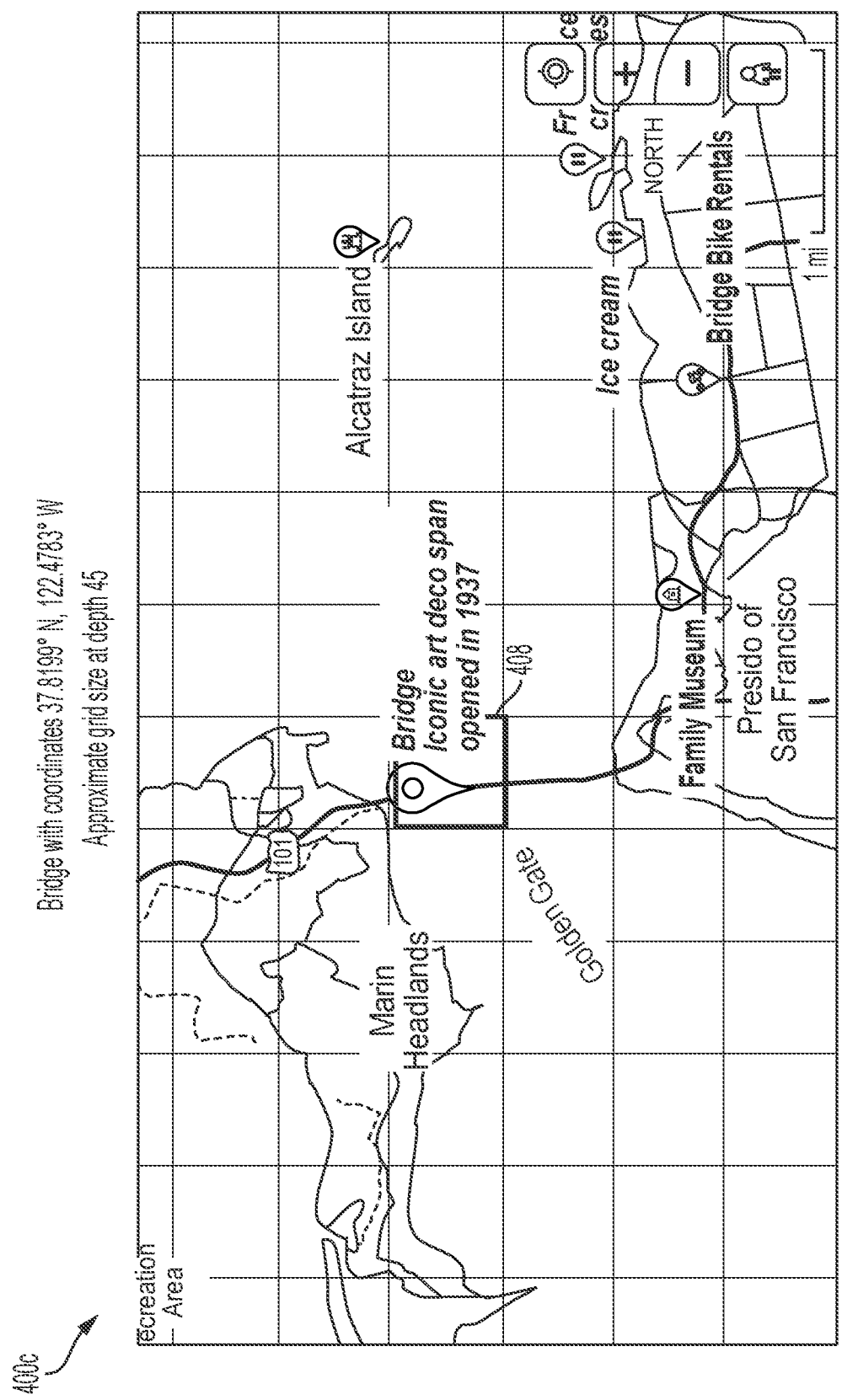

FIGS. 4A-4C show maps 400a, 400b, 400c to illustrate geohash covers generated by system 100 of FIG. 1, in accordance with embodiments of the present invention. Map 400a comprises a cell 402. Map 400b comprises a cell 404. Map 400b comprises a cell 408. Cells 402, 404, and 408 are each associated with a differing size. Cells 402, 404, and 408 are generated during a process for creating a filter table. During the process, the user specifies a preferred geohash depth for geometries that are or will be stored within a spatial column. The preferred geohash depth is configured to set a cell size that fits best with the majority of shapes. The preferred geohash depth may be identified by analyzing existing data and may include mapping to geometry types or calculating statistics for lengths or areas of shapes, etc. Small geometries may require a larger geohash depth than large geometries in order to minimize a number of geohashes that represent an area thereby reducing a number of potential candidates during a filtering process. For example, if a geometry represents a building then a geohash depth may be selected such that a cell size of a few meters (e.g., cell 408 of FIG. 4C) is applied rather than a geohash depth that represents a cell size of several kilometers (e.g., cell 402 of FIG. 4A).

Figure 5:
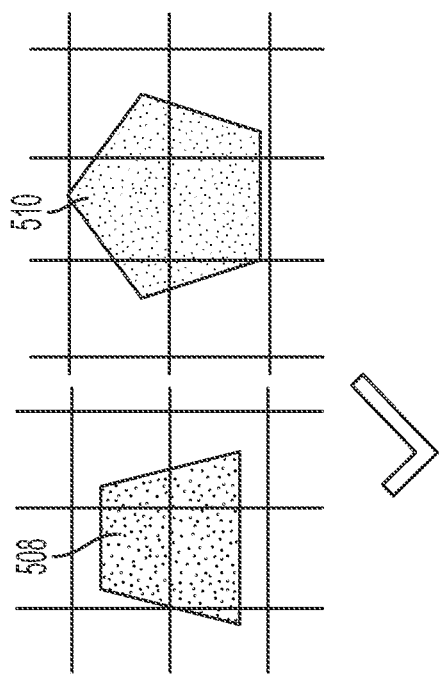
FIG. 5 illustrates a comparison of geohash values, in accordance with embodiments of the present invention.
Figure 5:
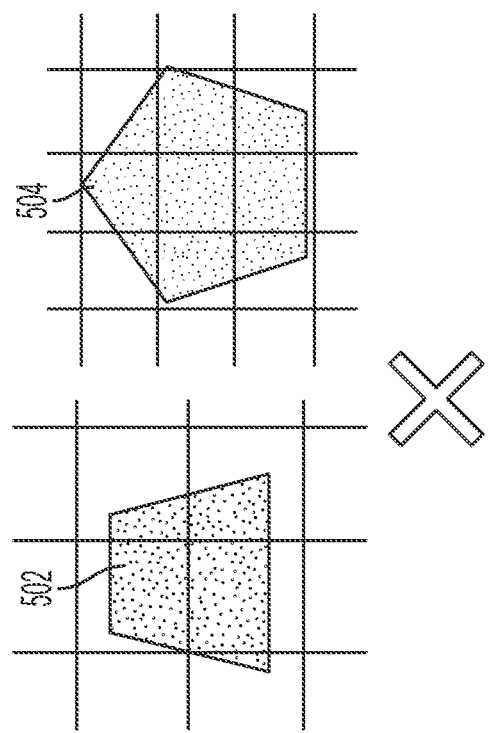

FIG. 5 illustrates a comparison of geohash values 502, 504, 508, and 510, in accordance with embodiments of the present invention. Geohash values 502, 504, 508, and 510 are configured to identify cells to locate matching cells for geometries within different sets. Cell sizes and associated geohash values must be computed at a same depth for executing a comparison process. Likewise, it may be necessary to store geohashes of various depths to accommodate vastly different geometry sizes. However, a filter table is not required to contain geohashes for all possible depth value and typical geohash depths may be identified and used to determine filter attributes in the filter table. FIG. 5 illustrates that geohash values 502 and 504 are not associated with a same depth and therefore a comparison process may not be executed. Likewise, FIG. 5 illustrates that geohash values 508 and 510 are associated with a same depth and therefore a comparison process may be executed.

Figure 6:
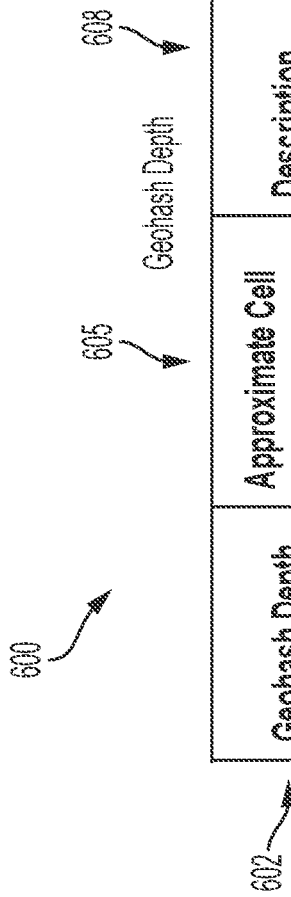
FIG. 6 illustrates a depth level classification within a filter table, in accordance with embodiments of the present invention.

FIG. 6 illustrates a depth level classification 602 in accordance with embodiments of the present invention. For example, a specified implementation may elect to define five common cell sizes 605 roughly corresponding to typical spatial geometries. An associated depth level designation 608 may include very small (e.g., a single address), small, medium, large, and very large. Table 600 presents an example of a relationship between a cell size and a depth level. Geohashes are then calculated as follows using: a preferred depth level selected from the classification in table 600, one depth level smaller than the preferred depth level, and all depth levels larger than the preferred depth level. Therefore, for a preferred level m, a maximum level n, and minimum level k, the geohash values for the following levels are calculated: If m=k then m, . . . , n otherwise m−1, n. For example, if a preferred level for a spatial column is medium, then a filter table contains geohashes for the small, medium, large and very large levels. The geohash value for the very small level is determined to be empty or undefined (NULL) and the preferred depth level medium is stored as metadata for the spatial column.

Figure 7B:
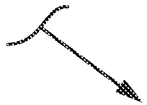

FIGS. 7A, 7B, and 7C illustrate a base table 701 and filter tables 702 and 704, in accordance with embodiments of the present invention. Base table 701 comprises an identifying column RIDE_ID and two spatial columns START_LOCATION and RIDE_PATH. Spatial column START_LOCATION comprises a geometry type of point. Given a five-level classification, a preferred geohash depth for an address matches to the smallest available level. Therefore, all values for the selected geohash structures are calculated and stored in filter table 702 (START_LOC_FILTER_TABLE) along with the RIDE_ID for storing an association with base table 701 using query processing information. Spatial column RIDE_PATH comprises a preferred level representing a very large region. Therefore, only large and very large levels are calculated and stored with the RIDE_ID in the RIDE_PATH_FILTER_TABLE. For example, when queries use a cartesian join between two sets of geometries to determine the relationship between geometries, for example, between the RIDE_PATH column and a column containing geometries representing parks with an associated preferred geohash level of medium, the geohashes in the associated filter tables are used to reduce the result set to candidates on which to perform the spatial calculation by comparing the geohashes in the smallest shared depth level, large, to reduce the result set to candidates on which to perform the spatial calculation.

The query processing may be automated by enabling dependencies of the columns that participate in a query to be analyzed and if a filter table is assigned, a preferred geohash depth level retrieved. Likewise, a lowest common geohash depth level of the spatial columns participating in the spatial function is determined and a check is added with respect to an equality of the geohash attributes in the filter tables associated with the spatial columns using the unique identifier of the geometry in the filter entry to associate the geohash with a related geometry. For example, table 600 (of FIG. 6) identifies five possible levels of geohash depth for a filter table implementation. Given these levels, if one geometry includes geohash values for levels medium to very large (a preferred level was determined as large) and the other geometry includes geohash values for levels very small to huge (the preferred level was very small or small), then the equality predicate is constructed based on the medium geohash values as these are the smallest common depth. The aforementioned process enables a function for identifying candidate geometries that are in a same area.

Figure 8:
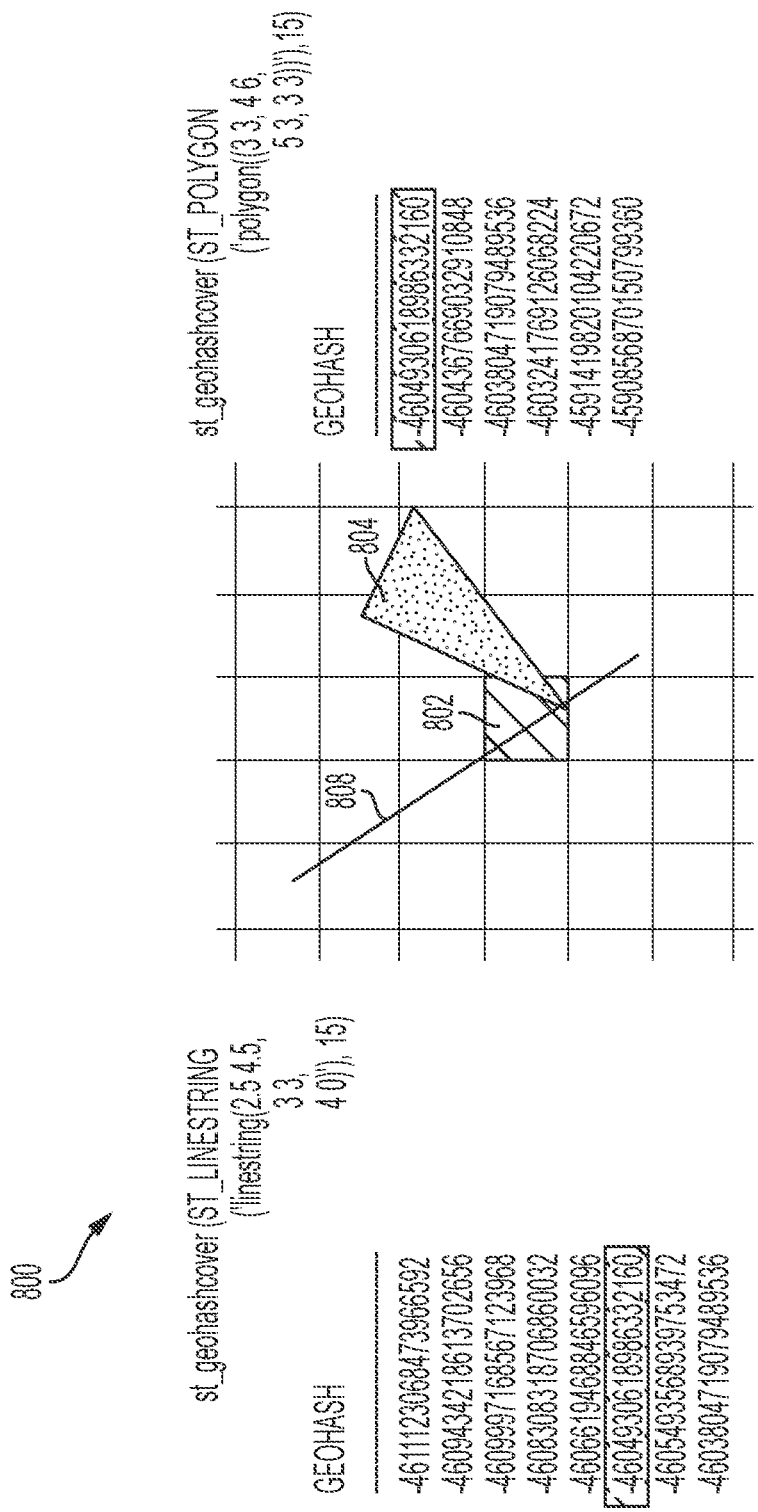
FIG. 8 illustrates a graph illustrating intersecting geohash covers, in accordance with embodiments of the present invention.

FIG. 8 illustrates a graph 800 illustrating intersecting geohash cover 802 between geometries 808 and 804, in accordance with embodiments of the present invention. FIG. 8 illustrates that the geohash covers for geometry 804 and for geometry 808 share at least one common cell (802) with a maximum separation comprising a length of one cell diagonal.

Figure 9:
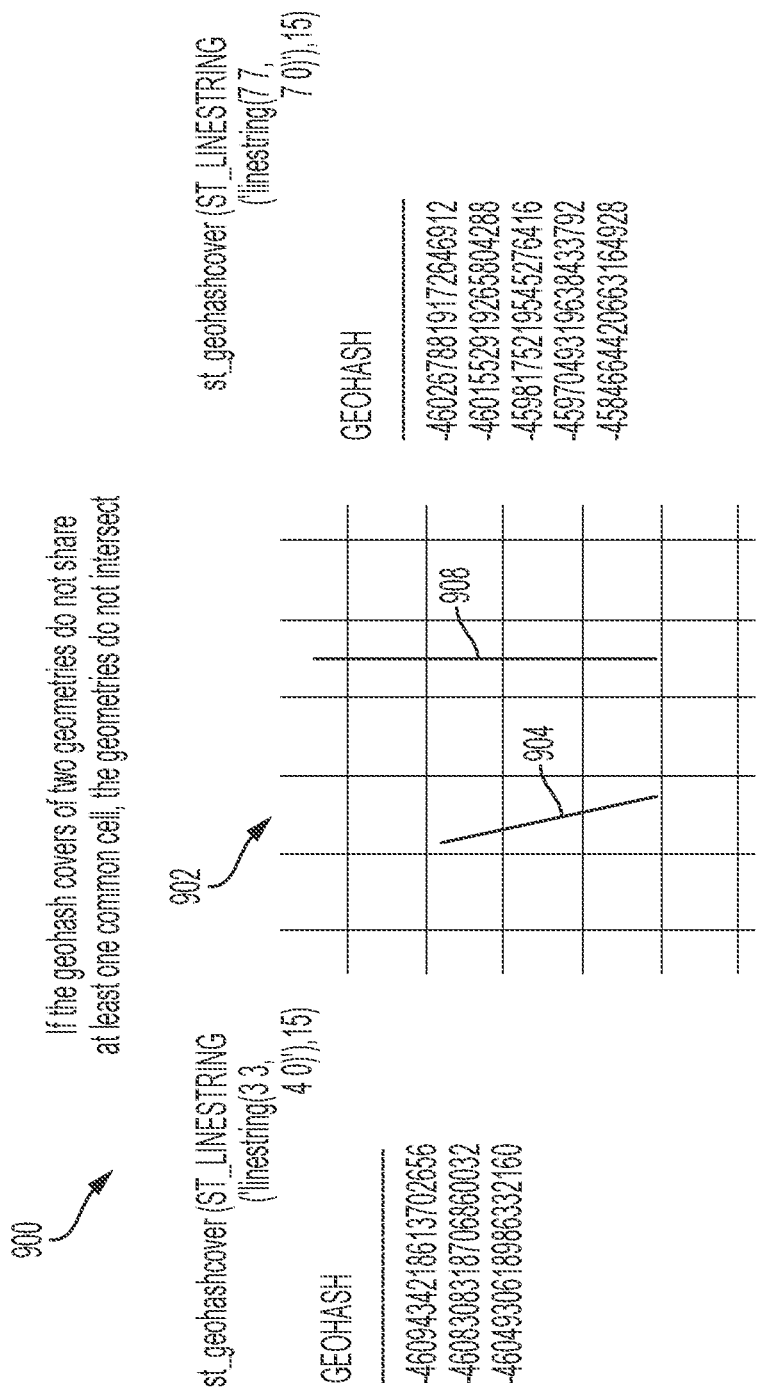
FIG. 9 illustrates a graph illustrating a non-match for geohash covers, in accordance with embodiments of the present invention.

FIG. 9 illustrates a graph 900 illustrating a non-match for geometries 904 and 908, in accordance with embodiments of the present invention. The graph 900 illustrates that geometries 904 and 908 do not share at least one common cell in the geohash structure 902 and therefore the geometries do not intersect.

Figure 10:
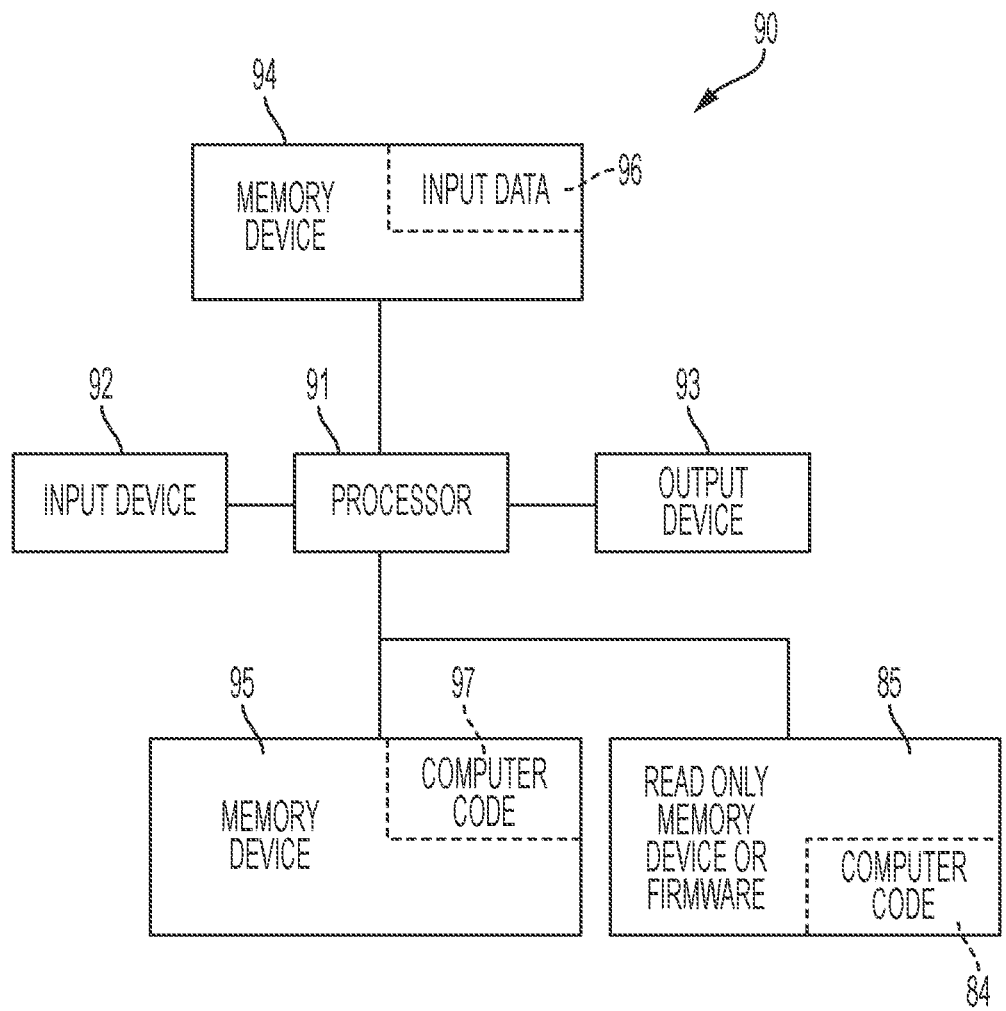
FIG. 10 illustrates a computer system used by the system of FIG. 1 for improving database technology associated with selecting depth levels for geohash structures, generating a filtering table and associated filter entries, and executing a database query with respect to the selected depth levels, the filter entries, and the filter table, in accordance with embodiments of the present invention.

FIG. 10 illustrates a computer system 90 (e.g., database controller 139 of FIG. 1) used by or comprised by the system of FIG. 1 for improving database technology associated with selecting geohash depth levels for spatial columns, generating a filtering table and associated filter entries, and executing a database query with respect to the selected depth levels, the filter entries, and the filter table, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 10 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving database technology associated with selecting depth levels for geohash structures, generating a filtering table and associated filter entries, and executing a database query with respect to the selected depth levels, the filter entries, and the filter table. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve database technology associated with selecting depth levels for geohash structures, generating a filtering table and associated filter entries, and executing a database query with respect to the selected depth levels, the filter entries, and the filter table. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving database technology associated with selecting depth levels for geohash structures, generating a filtering table and associated filter entries, and executing a database query with respect to the selected depth levels, the filter entries, and the filter table. In another embodiment, the invention provides a business method that performs the process steps of the invention on a subscription, advertising, and/or fee basis. That is, a service supplier, such as a Solution Integrator, could offer to enable a process for improving database technology associated with selecting depth levels for geohash structures, generating a filtering table and associated filter entries, and executing a database query with respect to the selected depth levels, the filter entries, and the filter table. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 10 shows the computer system 90 as a configuration of hardware and software, any configuration of hardware and software, as would be known to a person of ordinary skill in the art, may be utilized for the purposes stated supra in conjunction with the computer system 90 of FIG. 10. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
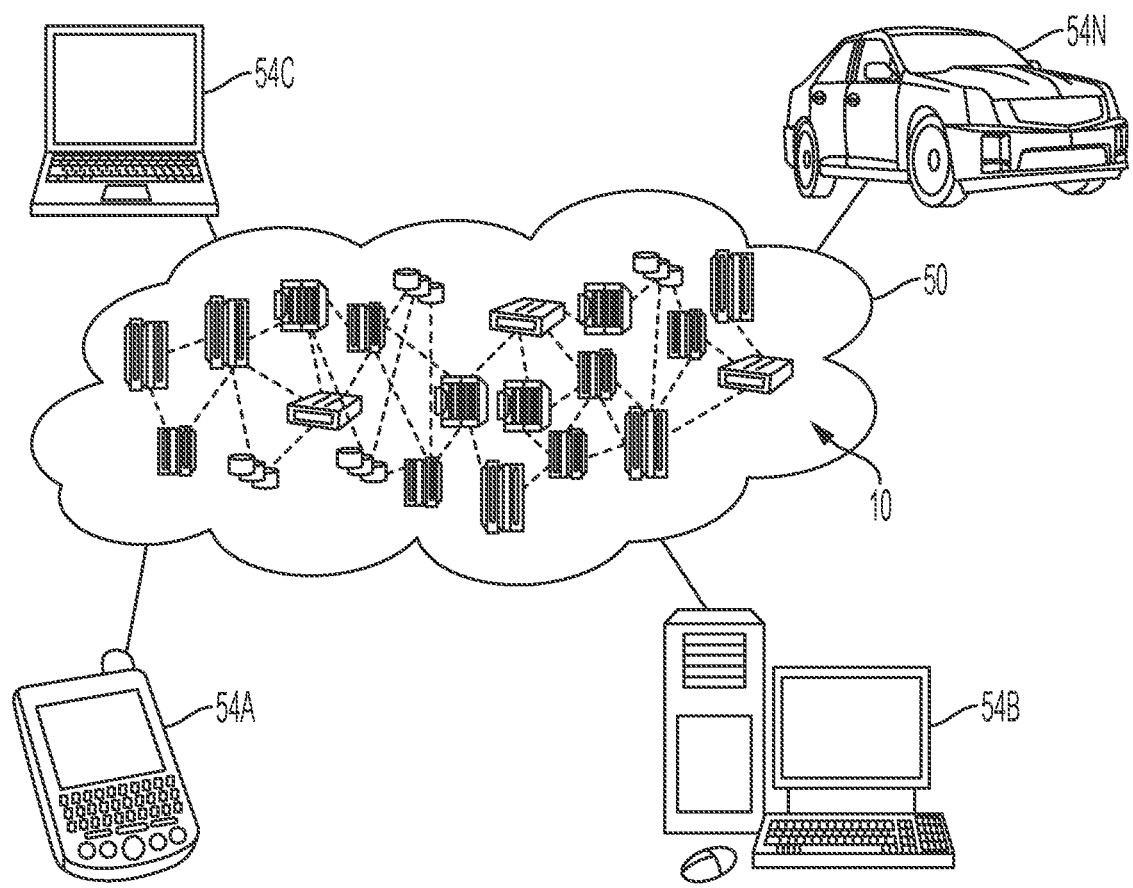
FIG. 11 illustrates a cloud computing environment, in accordance with embodiments of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 11 are intended to be illustrative only and that computing nodes 10 and cloud computing environment 50 can communicate with any type of computerized device over any type of network and/or network addressable connection (e.g., using a web browser).

Figure 12:
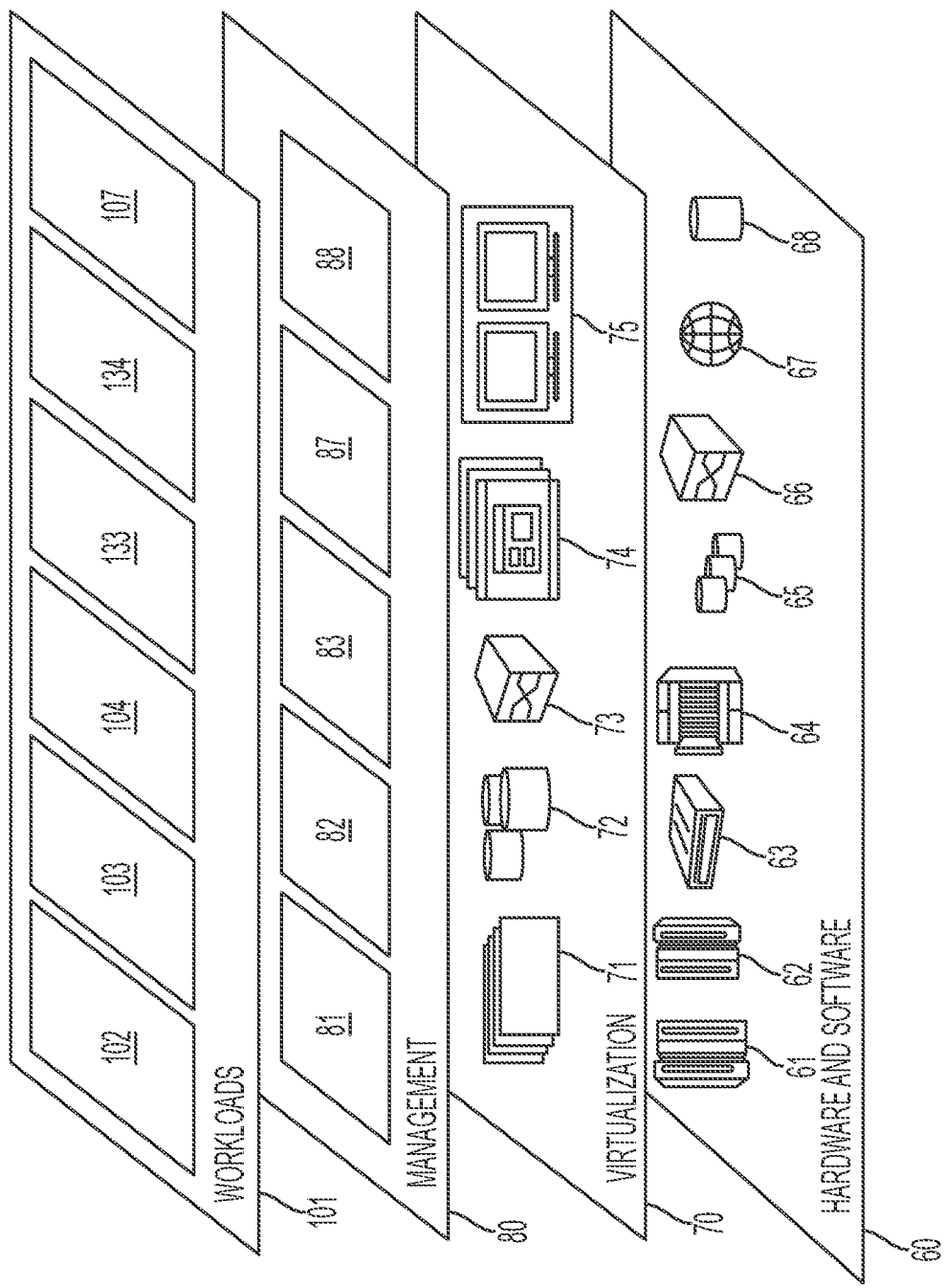
FIG. 12 illustrates a set of functional abstraction layers provided by cloud computing environment, in accordance with embodiments of the present invention.

Referring now to FIG. 12, a set of functional abstraction layers provided by cloud computing environment 50 (see FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and improving software and video technology associated with parsing audio and video data from an audio/video file, executing an associated query, and selecting depth levels for geohash structures, generating a filtering table and associated filter entries, and executing a database query with respect to the selected depth levels, the filter entries, and the filter table 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An automated query filtering method comprising:
   selecting, by a processor of an embedded database controller comprising specialized circuitry including a specialized integrated circuit and specialized software, a set of common geohash depth levels for a plurality of spatial columns;
   storing, by said processor, data indicating results of said selecting said set of common geohash depth levels;
   selecting, a specified depth level of said set of common geohash depth levels, wherein said specified depth level is selected from a spatial column of said plurality of spatial columns required to construct a plurality of geohash structures associated with said set of common geohash depth levels;
   automatically generating, by said processor, a filter table or index, wherein said filter table or index comprises a plurality of filtering candidate rows and said plurality of spatial columns, wherein each row of said plurality of filtering candidate rows comprises a unique row identifier, wherein each column of said plurality of spatial columns intersects with said plurality of filtering candidate rows, wherein each said special column comprises a unique column identifier, and wherein said plurality of spatial columns are associated with said spatial column based on the selected set of common geohash depth levels;
   storing within a database interconnected through a network to said database controller, by said processor, a relationship between said spatial column and said specified depth level and said filter table;
   generating, by said processor, filter entries for said filter table or index, wherein said generating said filter entries for said filter table or index comprises:
      generating, a plurality of geohash values with respect to associated geometries based on an assigned depth level (m); and
      storing, said plurality of geohash values within said plurality of spatial columns intersecting with said plurality of filtering candidate rows;
   executing, by said processor via execution of said filter table or index, a query of said plurality of geohash values within said database with respect to said specified depth level, said filter entries, and said filter table or index;
   generating, said processor in response to said executing said query, output comprising results of said query based on geospatial relationships of contents of spatial data in each row of said plurality of filtering candidate rows;
   generating, said processor based on said outputs, a map indicating geographical locations for a user; and
   presenting, by said processor to said user, said map thereby enabling said user to proceed to specified locations of said geographical locations.

2. The method of claim 1, wherein said selecting said specified depth level comprises:
   analyzing, a user selection from said set of common geohash depth levels.

3. The method of claim 1, wherein said selecting said specified depth level comprises:
   analyzing, a sample of said spatial data within said spatial column for determining said specified depth level.

4. The method of claim 1, wherein said selecting said specified depth level comprises:
   applying, a default value to said set of common geohash depth levels.

5. The method of claim 1, wherein said generating, said plurality of geohash values comprises:
   if said assigned depth level (m) for an associated geometry set equals a lowest defined geohash depth level, computing said plurality of geohash values associated with all depth levels from the set of common geohash depth levels.

6. The method of claim 1, wherein said generating, said plurality of geohash values comprises:
   if said assigned depth level (m) for an associated geometry set equals a highest defined geohash depth level, computing said plurality of geohash values for a highest depth level and a depth level located immediately below to said highest depth level.

7. The method of claim 1, wherein said generating, said plurality of geohash values comprises:
   if said assigned depth level (m) for said associated geometries are located between a highest and a lowest defined geohash depth level, computing said plurality of geohash values for said assigned level (m), a depth level located immediately below to said assigned depth level, and all depth levels located above said assigned depth level and up to a highest depth level.

8. The method of 1, wherein said executing said query of said database comprises:
   inputting, at least two sets of geometries that are equal to said spatial column into at least one spatial relation function associated with said query;
   selecting an assigned depth level for each set of geometries of said at least two sets of geometries associated with said query;
   selecting, a smallest shared populated depth level of a plurality of filter tables or indexes for each spatial column associated with said at least one spatial relation function;
   selecting groups of geometries of said at least two sets of geometries, wherein a value of a first geohash structure of an associated geometry of a first set of geometries matches an additional value of a second geohash structure of an associated geometry of a second set of geometries; and
   executing specialized software with respect to matched geometries within said groups of geometries such that results of said query are generated.

9. The method of 1, further comprising:
   generating, by said processor, a modified query associated with said query to determine equality between said plurality of geohash values.

10. The method of 9, further comprising:
   executing, by said processor, said modified query of said database with respect to said specified depth level, said filter entries, and said filter table or index.

11. The method of claim 1, further comprising:
   providing at least one support service for at least one of creating, integrating, hosting, maintaining, and deploying computer-readable code in the database controller, said code being executed by the computer processor to implement: said selecting said set of common geohash depth levels, said storing said data, said selecting said specified depth level, said automatically generating, said storing within said database, said generating, and said executing.

12. A computer program product, comprising a computer readable hardware storage device storing a computer readable program code, said computer readable program code comprising an algorithm that when executed by a processor of an embedded database controller comprising specialized circuitry including a specialized integrated circuit and specialized software implements an automated query filtering method, said method comprising:
   selecting, by said processor, a set of common geohash depth levels for a plurality of spatial columns;
   storing, by said processor, data indicating results of said selecting said set of common geohash depth levels;
   selecting, a specified depth level of said set of common geohash depth levels, wherein said specified depth level is selected from a spatial column of said plurality of spatial columns required to construct a plurality of geohash structures associated with said set of common geohash depth levels;
   automatically generating, by said processor, a filter table or index, wherein said filter table or index comprises a plurality of filtering candidate rows and said plurality of spatial columns, wherein each row of said plurality of filtering candidate rows comprises a unique row identifier, wherein each column of said plurality of spatial columns intersects with said plurality of filtering candidate rows, wherein each said column comprises a unique column identifier, and wherein said plurality of spatial columns are associated with said spatial column based on the selected set of common geohash depth levels;
   storing within a database interconnected through a network to said database controller, by said processor, a relationship between said spatial column and said specified depth level and said filter table;
   generating, by said processor, filter entries for said filter table or index, wherein said generating said filter entries for said filter table or index comprises:
      generating, a plurality of geohash values with respect to associated geometries based on an assigned depth level (m); and
      storing, said plurality of geohash values within said plurality of spatial columns intersecting with said plurality of filtering candidate rows;
   executing, by said processor via execution of said filter table or index, a query of said plurality of geohash values within said database with respect to said specified depth level, said filter entries, and said filter table or index;
   generating, said processor in response to said executing said query, output comprising results of said query based on geospatial relationships of contents of spatial data in each row of said plurality of filtering candidate rows;
   generating, said processor based on said outputs, a map indicating geographical locations for a user; and
   presenting, by said processor to said user, said map thereby enabling said user to proceed to specified locations of said geographical locations.

13. The computer program product of claim 12, wherein said selecting said specified depth level comprises:
   analyzing, a user selection from said set of common geohash depth levels.

14. The computer program product of claim 12, wherein said selecting said specified depth level comprises:
   analyzing, a sample of said spatial data within said spatial column for determining said specified depth level.

15. The computer program product of claim 12, wherein said selecting said specified depth level for a spatial column comprises:
   applying, a default value to said set of common geohash depth levels.

16. The computer program product of claim 12, wherein said generating, said plurality of geohash structures comprises:
   if said assigned depth level (m) for an associated geometry set equals a lowest defined geohash depth level, computing said plurality of geohash values associated with all depth levels from the set of common geohash depth levels.

17. The computer program product of claim 12, wherein said generating, said plurality of geohash structures comprises:
   if said assigned depth level (m) for an associated geometry set equals a highest defined geohash depth level, computing said plurality of geohash values for a highest depth level and a depth level located immediately below said highest depth level.

18. An embedded database controller comprising comprising specialized circuitry including a specialized integrated circuit, specialized software, and a processor coupled to a computer-readable memory unit, said memory unit comprising instructions that when executed by the processor implements an automated query filtering method comprising:
   selecting, by said processor, a set of common geohash depth levels for a plurality of spatial columns;
   storing, by said processor, data indicating results of said selecting said set of common geohash depth levels;
   selecting, a specified depth level of said set of common geohash depth levels, wherein said specified depth level is selected from a spatial column of said plurality of spatial columns required to construct a plurality of geohash structures associated with said set of common geohash depth levels;
   automatically generating, by said processor, a filter table or index, wherein said filter table or index comprises a plurality of filtering candidate rows and said plurality of spatial columns, wherein each row of said plurality of filtering candidate rows comprises a unique row identifier, wherein each column of said plurality of spatial columns intersects with said plurality of filtering candidate rows, wherein each said column comprises a unique column identifier, and wherein said plurality of spatial columns are associated with said spatial column based on the selected set of common geohash depth levels;
   storing within a database interconnected through a network to said database controller, by said processor, a relationship between said spatial column and said specified depth level and said filter table;
   generating, by said processor, filter entries for said filter table or index, wherein said generating said filter entries for said filter table or index comprises:
      generating, a plurality of geohash values with respect to associated geometries based on an assigned depth level (m); and storing, said plurality of geohash values within said plurality of spatial columns intersecting with said plurality of filtering candidate rows;

executing, by said processor via execution of said filter table or index, a query of said plurality of geohash values within said database with respect to said specified depth level, said filter entries, and said filter table or index;

generating, said processor in response to said executing said query, output comprising results of said query based on geospatial relationships of contents of spatial data in each row of said plurality of filtering candidate rows;

generating, said processor based on said outputs, a map indicating geographical locations for a user; and presenting, by said processor to said user, said map thereby enabling said user to proceed to specified locations of said geographical locations.

\* \* \* \* \*